United States Patent Office 3,513,113
Patented May 19, 1970

3,513,113
PRODUCTION OF SELF-EXTINGUISHING
POLYURETHANES
Hans Eberhard Praetzel, Bensberg-Frankenforst, and
Herbert Jenkner, Cologne-Deutz, Germany, assignors
to Chemische Fabrik Kalk GmbH, Cologne-Kalk,
Germany
No Drawing. Filed Dec. 28, 1965, Ser. No. 517,125
Int. Cl. C08g 22/14, 22/44
U.S. Cl. 260—2.5                                6 Claims

ABSTRACT OF THE DISCLOSURE

Self-extinguishing, cured polyurethane products which are foamed or not, which comprise a certain amount of bromine and phosphorous, the later bound chemically in the polyurethane through P—C bonds.

---

The present invention relates to an improved process for the production of self-extinguishing polyurethanes which may, if desired, also be of the foamed type.

The production of polyurethanes by reaction of polyfunctional isocyanates with polyesters or polyethers which contain free hydroxyl groups is well known. The polyurethanes thus produced, however, cannot be used for many technical purposes because they are easily inflammable. It is also known that the combustibility of polyurethanes is reduced if they contain halogen and/or phosphorus containing compounds.

Such halogen containing flame retarding components for example, can be Diels-Alder adducts which are miscible with polyesters and which are obtained by the addition of polyhydric unsaturated alcohols or polybasic unsaturated polycarboxylic acids into hexachlorocyclopentadiene and which contain free hydroxyl or carboxyl groups. Polyesters which are produced on the basis of tetrachlorophthalic acid or dibromosuccinic acid are also suited for the production of halogen containing polyurethanes. The halogen content also can be introduced into the macromolecules of the polyurethanes with the aid of halogen containing polyethers. Such polyethers can be produced by reacting halogen free alcohols or phenols with epihalohydrin or dihalohydrin. According to another process pentabromodiphenyl ether is added to the mixtures used to form the polyurethanes. Whereas the flame retarding action caused by the liberation of halogens only begins at rather high flame temperatures in aromatic halogen compounds, the aliphatic halogen compounds liberate halogen at relatively lower flame temperatures. If halogen compounds are employed as the sole flame retarding agent they must be present in the polyurethanes in large quantities in order to provide satisfactory flame protection. However, a high halogen content has an unfavorable effect on the physical and mechanical properties of the polyurethanes.

These disadvantageous consequences can at least partially be avoided by the addition of organic phosphorus containing compounds to the polyurethanes either alone or in conjunction with organically bound halogen. The esters of phosphoric or phosphorous acid which also may contain halogen such as tris-(dibromo)-propylphosphate are suited for this purpose. Low molecular weight phosphorus compounds, which are not built into the polyurethane macromolecule by chemical reaction, however, have a tendency to migrate, so that the resin even under normal conditions will lose its fire retardant qualities after a period of time. In view of this, it can be advantageous to employ phosphoric acid esters which are reactive with hydroxyl or isocyanate groups, such as, for example, hydroxyl group containing polyethers whose free hydroxyl groups are partially esterified with phosphoric acid or hydroxy alkyl esters of phosphoric or phosphorous acid, such as, phenylphosphonic acid-(β-hydroxyethyl)-ester or 2-bromoethyl phosphoric acid diglycol ester. It is also possible to use hydroxyl and phosphoric acid group containing polyesters which, for example, can be obtained by transesterification of trialkyl phosphites with polyesters.

The phosphorus compounds described above, however, are built into the macromolecules of the polyurethanes through P—O—C bonds, which are hydrolysable. Such hydrolysis gives rise to cleavage of the macromolecule. The lower molecular weight phosphorus containing cleavage products occurring on hydrolysis have a tendency to migrate and in addition catalyse the usually rather slow decomposition of the polyurethane macromolecules. As a consequence, attempts have been made to build phosphorus into the polyurethane macromolecules over non-hydrolysable P—C bonds. Recently, tris-(hydroxymethyl-phosphine oxide or tetrakis-(hydroxymethyl) phosphonium chloride have been used for this purpose. However, in view of their polyfunctionality, they give rise to considerable cross-linking which respectively causes an increase in the brittleness of the polyurethanes produced therewith.

It is therefore is an object of the invention to produce self-extinguishing polyurethanes while avoiding the aforementioned disadvantages.

According to the invention it was found that this object could be achieved when polyurethanes, foamed or unfoamed are produced by curing compositions which contain polyethers and/or polyesters containing at least two free hydroxyl groups, polyfunctional isocyanates, the usual catalysts and adjuvants, as well as organic bromine and phosphorus compounds which can take part in the condensation reaction and, if desired, blowing agents, if saturated aliphatic ethers containing one or more free hydroxyl groups containing a quaternary carbon atom carrying one or more bromomethyl groups are employed as the organic bromine compound and aliphatic ethers of bis-(hydroxyalkane)-phosphinic acid esters containing free hydroxyl groups are employed as the organic phosphorus compound in such compositions.

All of the usual polyfunctional isocyanates used for the production of polyurethanes are suitable for the purposes of the present invention. Arylene isocyanates, such as, for example, toluylene diisocyanate and polymethylene polyphenyl polyisocyanates, however, are especially suited. As the other components which are necessary for the production of polyurethanes all usual polyesters and polyethers which contain free hydroxyl groups can be employed. The presence of usual adjuvants employed in the production of polyurethanes, such as, catalysts, emulsifiers, blowing agents and foam stabilizers do not unfavorably influence the process according to the invention.

According to the invention a portion of the necessary hydroxyl group containing polyesters or polyethers required for the production of the polyurethanes is replaced by the organic bromine and phosphorus compounds defined below which also carry free hydroxyl groups. The quantity of free hydroxy groups introduced by these organic bromine and phosphorus compounds should be approximately equal to the quantity of hydroxyl groups in the polyethers or polyesters replaced.

According to the invention aliphatic ethers which contain one or more free hydroxyl groups and a quaternary carbon atom which carries at least 1 bromomethyl group are employed as the organic bromine compounds.

These compounds can be produced by reacting organic bromine compounds of the formula

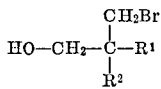

in which each of $R^1$ and $R^2$ taken individually can be one of the following radicals: —$CH_2OH$, —$CH_2Br$, —$CH_3$, —$C_2H_5$, —$C_3H_7$,

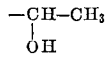

with compounds of the formula

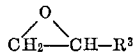

in which $R^3$ is —H, —$CH_3$, —$CH_2OH$, —$CH_2Br$, —$CH_2Cl$, —$COOCH_3$, —$COOC_2H_5$ or —$C_6H_5$ in a molar ratio between 1:1 and 1:20.

The following compounds are illustrative of compounds of Formula I:

pentaerythritol-monobromohydrin,
pentaerythritol-dibromohydrin,
pentaerythritol-tribromohydrin,
1,1-dimethylol-1-bromomethyl-ethane,
1-methylol-1,1-bis-(bromomethyl)-ethane,
1,1-dimethylol-1-bromomethyl-propane,
1-methylol-1,1-bis-(bromomethyl)-propane,
1,1-dimethylol-1-bromomethyl-butane,
1-methylol-1,1-bis-(bromomethyl)-butane,
1,1,1-trimethylol-isopropanol-monobromohydrin,
1,1,1-trimethylol-isopropanol-dibromohydrin,
1,1,1-trimethylol-isopropanol-tribromohydrin.

For sake of simplicity these compounds subsequently will be identified as bromine compounds I.

The following are illustrative of compounds of Formula II: ethylene oxide, propylene oxide, styrene oxide, epichlorohydrin, epibromohydrin, glycidol, glycidic acid methyl ester and glycidic acid ethyl ester.

In the reaction of bromine compounds I with compounds of Formula II etherification of the hydroxy alkane groups takes place with opening up of the oxirane ring to a primary or secondary alcohol group. If the molar ratio of the epoxy compound is less than corresponds to the number of free hydroxyl groups in the bromine compound I concerned, only a partial etherification takes place. In order to be certain to achieve the etherification of at least one hydroxyl group in each molecule of the bromine compound I at least 1.2 mol of the compound of Formula II should be employed. The liquid reaction products thus prepared have a bromine content of 3 to 68 weight percent.

These liquid reaction products can easily be mixed with the other component used in polyurethane production to homogeneous molding masses. In the curing of the molding masses to produce the self-extinguishing polyurethanes the free hydroxyl groups of such liquids react with the isocyanate groups of the polyfunctional isocyanates so that the bromine is chemically bound in the macromolecule polyurethane molecule produced.

The polyurethane products produced according to the invention, in addition to containing organically bound bromine, also contain organically bound phosphorus. For this purpose aliphatic ethers of bis-(hydroxyalkane)-phosphinic acid esters which contain free hydroxyl groups are also admixed with the other components used in the formation of the polyurethane molding masses.

Such ethers can be produced from bis - (hydroxyalkane)-phosphinic acids of the formula

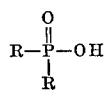

in which R can represent the following radicals:
—$CH_2OH$, —$CH_2CH_2OH$, —$CH_2$—$CH_2$—$CH_2OH$,
—$CH_2CHOH$—$CH_2OH$, —$CH_2$—$CHCl$—$CH_2OH$,
—$CHOHR^1$ wherein $R^1$ represents —$CH_3$, —$C_2H_5$, —$C_3H_7$, —$C_4H_9$, —$CH_2CHOH$—$CH_3$.

Such compounds of Formula III are first etherified, for example, by reaction with compounds of Formula II in molar rations of 1:2 to 1:10. Such etherification is advantageously carried out by heating the reaction mixture to temperatures between 40 to 160° C. under a gauge pressure of 1 to 100 atmospheres. The ethers which are produced can be neutralized, for example, by addition of alkali metal hydroxides or carbonates to produce the corresponding alkali metal salts, especially the sodium or potassium salts, and such salts esterified with epichlorohydrin with formation of alkali metal chloride. For this purpose the mixture of the ethers produced and the epichlorohydrin are boiled under reflux until no further alkali metal chloride separates off. It is also possible to employ the bis-(hydroxyalkane)-phosphinic acid in the form of its alkali metal salt as starting material and react such salt with epichlorohydrin in a molar ratio of at least 1:3 in order to produce the desired ethers of bis-(hydroxyalkane)-phosphinic acid esters in one step.

Thus, white phosphorus reacts with stoichiometric quantities of alkali metal hydroxide, water, and aldehydes in the presence of alcohols to yield a quantity of nonvolatile compounds corresponding to more than 90% of the starting quantity. The remainder of the phosphorus is in part converted to phosphine. Nevertheless, the quantity of phosphine produced in this reaction is considerably less than when white phosphorus is reacted with an (alkaline earth) alkali metal hydroxide and water in the absence of aldehydes. The non-volatile reaction products contain, in addition to subordinate quantities of other phosphorus-containing compounds, mainly the alkali metal salts of the bis-(hydroxy alkane) phosphinic acids. This reaction product is subsequently, preferably without purification or separation, converted by reaction with epoxy compounds into polyethers containing alcoholic hydroxyl groups and phosphorus.

In carrying out the process, the white phosphorus is first introduced into a liquid saturated alcohol, such as, for instance, methanol, ethanol, propanol, isopropanol, butanol, isobutanol, or a mixture of such alcohols. 2.0 to 4.0 moles of aldehydes per gram atom of the phosphorus present therein are added to said mixture while passing nitrogen therethrough, and the resulting mixture is heated to temperatures from 30° C. to 75° C., preferably from 45° C. to 65° C. At this temperature, a solution of 0.75 mole to 0.85 mole of alkali metal hydroxide, perferably sodium or potassium hydroxide, and water in a liquid aliphatic alcohol is added to the reaction mixture per gram atom of its phosphorus content. The total quantity of alcohol supplied to the reaction mixture should amount to about 20 moles per gram atom of phosphorus. The temperature of the reaction mixture during the reaction which proceeds with evolution of phosphine, is maintained at the above mentioned degrees. Surprisingly the quantity of phosphine produced is only about 10% to 35% of the quantity which is normally formed in the production of hypophosphorous acid from white phosphorus. Subsequent to the reaction the solvent is removed from the reaction mixture by distillation, if desired, under reduced pressure. A residue of high viscosity which solidifies upon cooling and which predominantly consists of the corresponding alkali metal salt of the bis-(hydroxy alkane) phosphinic acid remains. Said crude product is employed directly for the production of the polyethers containing alcoholic hydroxyl groups and phosphorus.

For this purpose, the reaction product is heated under reflux with 3 moles to 10 moles of epichlorohydrin per gram atom of phosphorus contained therein. In this reaction, on the one hand, the hydroxy alkane groups of the alkali metal salt of the bis-(hydroxy alkane) phosphinic acid are etherified, whereby the epoxy ring of the epichlorohydrin is split up to secondary hydroxyl groups, and, on the other hand, the phosphinic acid groups are esterified with formation of an alkali metal chloride. In this manner the polyethers containing alcoholic hydroxyl groups and phosphorus are obtained.

The etherification of the reaction products which primarily consist of the alkali metal salts of bis-(hydroxy alkane) phosphinic acid, can however, also be carried out with other epoxy compounds, such as, for instance, ethylene oxide, propylene oxide, styrene oxide, epibromohydrin, glycidol. In these instances the reaction products are heated with 2 moles to 5 moles of epoxy compound per gram atom of the phosphorus contained in said reaction products, preferably under superatmospheric pressure up to 100 atmospheres, to temperatures up to 160° C. In such etherification a partial esterification of the phosphinic acid groups also take place simultaneously. However, the acid number of said phosphinic acid polyethers is still too high. Therefore, they are further esterified with epichlorohydrin subsequently to the etherification. For this purpose the alkali metal salts of the phosphinic acid polyethers are boiled under reflux with epichlorohydrin until the acid number has decreased to values of 6 to 3 and less, whereafter the excess epichlorohydrin is distilled off. It can be of advantage for the progress of the reaction to introduce a small quantity of alkali metal chloride into the reaction mixture together with the epichlorohydrin. Quantities of 0.5 parts to 5.0 parts, by weight, of alkali metal chloride per 100 parts, by weight, of epichlorohydrin can already be sufficient. The quantity suited in each instance can easily be ascertained by simple preliminary tests.

The process is illustrated hereinafter by a number of examples. The process of the invention, however, is not limited to said examples.

EXAMPLE A (a) 225 parts, by weight, of paraformaldehyde are added to 93 parts, by weight, of white phosphorus in 840 parts, by weight, of methanol and the reaction vessel is rinsed with nitrogen. The mixture is then heated to about 55° C. and 93.8 parts, by weight, of sodium hydroxide dissolved in 42.4 parts, by weight, of water and 810 parts, by weight, of methanol, are added slowly thereto while continuously introducing nitrogen. The paraformaldehyde is dissolved within a short period of time and a mixture of nitrogen and phosphine escapes.

The reaction solution is kept at a temperature of 55° C. for 3 further hours and after cooling, it is freed by filtration from the slight turbidity therein. The methanol is removed from the filtrate by distillation, finally in a vacuum. A viscous mass which solidifies on cooling remains. The yield is 406 parts, by weight, of a crude product with a phosphorus content of 21.3%, by weight. Thus 92.5%, by weight, of the phosphorus supplied has been converted to non-volatile compounds.

(b) Said crude product, the main constituent of which is the sodium salt of bis-(hydroxy methane) phosphinic acid is directly used for the production of the polyethers containing alcoholic hydroxyl groups and phosphorus. For this purpose 37 parts, by weight, of said crude product are heated under reflux and with stirring with 116 parts, by weight, of epichlorohydrin. Sodium chloride precipitates in the course of this reaction.

After the reaction is completed, the sodium chloride is filtered off and the resulting filtrate is cooled. The excess of epichlorohydrin is then distilled off from the filtrate under reduced pressure. 112 parts, by weight, of a viscous, light yellow product with a chlorine content of 20.3%, by weight, a phosphorus content of 8.6%, by weight, a hydroxyl number of 264, and an acid number of 3 remain thereby. About 2.9 moles of epichlorohydrin have reacted per gram atom of phosphorus supplied.

EXAMPLE B (a) 225 parts, by weight, of paraformaldehyde are added to 93 parts, by weight, of white phosphorus under 840 parts, by weight, of methanol and the reaction vessel is rinsed with nitrogen. The mixture is then heated to about 55° C. and 132 parts, by weight, of potassium hydroxide dissolved in 42.4 parts, by weight, of water and 830 parts, by weight, of methanol are added slowly thereto while continuously introducing nitrogen thereinto.

The reaction solution is maintained at a temperature of 55° C. for 3 further hours and, after cooling, is freed by filtration from the slight turbidity therein. The methanol is removed from the filtrate by distillation finally in a vacuum. A viscous mass which solidifies on cooling remains. The yield is 444 parts, by weight, of a crude product with a phosphorus content of 19.0%, by weight. Thus 91.5%, by weight, of the phosphorus supplied have been converted to non-volatile compounds.

(b) Said crude product, the main constituent of which is the potassium salt of bis-(hydroxy methane) phophinic acid, is then directly used for the production of the polyethers containing alcoholic hydroxyl groups and phosphorus. For this purpose 328 parts, by weight, of said crude product are heated at 120° C. with 127 parts, by weight, of propylene oxide for 2½ hours while shaking. 451 parts, by weight, of a water clear, viscous liquid with a phosphorus content of 12.9%, by weight, are obtained. This product is again reacted with 119 parts, by weight, of propylene oxide under the above mentioned conditions. 465 parts, by weight, of a water clear, viscous liquid with a phosphorus content of 11.1%, by weight, are obtained.

The reaction product is then heated under reflux with 250 parts, by weight, of epichlorohydrin while stirring. Potassium chloride precipitates in the course of the reaction.

After the reaction is completed, the reaction mixture is cooled and the potassium chloride is filtered off. The excess of epichlorohydrin is then distilled off from the filtrate under reduced pressure. 460 parts, by weight, of a viscous, light yellow product of a chlorine content of 3.8%, by weight, of a phosphorus content of 10.8%, by weight, of a hydroxyl number of 348, and of an acid number of 4 remain.

EXAMPLE C (a) 36 parts, by weight, of paraformaldehyde are added to 14.9 parts, by weight, of white phosphorus under 160 parts, by weight, of methanol and the reaction vessel is rinsed with nitrogen. The mixture is then heated to about 55° C. and 15 parts, by weight, of sodium hydroxide dissolved in 6.8 parts, by weight, of water and 154 parts, by weight, of methanol are added slowly thereto while continuously introducing nitrogen thereinto.

The paraformaldehyde is dissolved within a short period of time and a mixture of nitrogen and phosphine escapes.

The reaction solution is kept at a temperature of 55° C. for 3 further hours and, after cooling, it is freed by filtration from the slight turbidity therein. The methanol is removed from the filtrate by distillation, finally in a vacuum.

(b) The remaining reaction product, the main constituent of which consists of the sodium salt of bis-(hydroxy methane) phosphinic acid, is directly employed for the production of the polyethers containing alcoholic hydroxyl groups and phosphorus. For this purpose said crude product is heated under reflux and with stirring with 240 parts, by weight, of styrene oxide. After completion of the reaction, the excess of styrene oxide is removed by distillation. 228 parts, by weight, of a viscous product with a phosphorus content of 6.5% remain.

About 2.56 moles of styrene oxide have reacted per gram atom of phosphorus supplied.

The reaction product is then heated under reflux with 70 parts, by weight, of epichlorohydrin while stirring. Sodium chloride precipitates in the course of the reaction.

After the reaction is completed, the reaction mixture is cooled and the sodium chloride is filtered off. The excess of epichlorohydrin is then distilled off from the filtrate under reduced pressure. 227 parts, by weight, of a viscous, light yellow product with a chlorine content of 2.0%, by weight, a phosphorus content of 5.3%, by weight, a hydroxyl number of 250, and an acid number of 2.5 remain. About 1.25 moles of epichlorohydrin have reacted per gram atom of phosphorus supplied.

EXAMPLE D (a) 86.52 parts, by weight, of butyraldehyde are added to 14.9 parts, by weight, of white phosphorus under 160 parts, by weight, of methanol and the reaction vessel is rinsed with nitrogen. The mixture is then heated to 50° C. and 15 parts, by weight, of sodium hydroxide dissolved in 6.8 parts, by weight, of water and 155 parts, by weight, of methanol are added slowly thereto while continuously introducing nitrogen. During the reaction a mixture of nitrogen and phosphine escapes.

The reaction solution is kept at a temperature of 50° C. for 3 further hours. Thereafter, the methanol and the excess butyraldehyde are removed by distillation, finally in a vacuum. 97 parts, by weight, of reaction product remain as a tenacious, viscous mass.

(b) Said crude product, the main constituent of which is the sodium salt of bis-(hydroxy butane) phosphinic acid, is directly used for the production of the polyethers containing alcoholic hydroxyl groups and phosphorus.

For this purpose 97 parts, by weight, of said crude product are heated under reflux with 185 parts, by weight of epichlorohydrin while stirring. In the course of the reaction sodium chloride precipitates.

After the reaction is completed, the sodium chloride is filtered off and the filtrate obtained thereby is cooled. The excess of epichlorohydrin is distilled off from the filtrate under reduced pressure. 212 parts, by weight, of a light yellow, viscous product remain, said product having a chlorine content of 7.2%, by weight, a phosphorus content of 11.2%, by weight, a hydroxyl number of 304, and an acid number of 3. About 1.5 moles of epichlorohydrin have reacted per gram atom of the phosphorus supplied.

EXAMPLE E (a) 52.86 parts, by weight, of aldol are added to 7.45 parts, by weight, of white phosphorus under 80 parts, by weight, of methanol and the reaction vessel is rinsed with nitrogen. The mixture is then heated to 55° C. and 7.5 parts, by weight, of sodium hydroxide dissolved in 3.4 parts, by weight, of water and 75 parts, by weight, of methanol, are added slowly thereto while continuously introducing nitrogen thereinto.

The reaction solution is kept at a temperature of 55° C. for 3 further hours. Thereafter, the methanol and the excess of aldol are removed by distillation, finally in a vacuum.

(b) The remaining product, the main constituent of which is the sodium salt of bis-(2,4-dihydroxy butane) phosphinic acid, is directly used for the production of the polyether containing alcoholic hydroxyl groups and phosphorus. For this purpose said crude product is heated under reflux with 162 parts, by weight, of epichlorohydrin while stirring. Sodium chloride precipitates in the course of the reaction.

After the reaction is completed, the sodium chloride is filtered off and the resulting filtrate is cooled. The excess of epichlorohydrin is distilled off from the filtrate under reduced pressure. 136.2 parts, by weight, of a viscous product with a chlorine content of 18.5%, by weight, a phosphorus content of 6.2%, by weight, a hydroxyl number of 430, and an acid number of 6 remain. About 3.5 moles of epichlorohydrin have reacted per gram atom of the phosphorus supplied.

Illustrative examples of bis-(hydroxyalkane)-phosphinic acid esters of Formula III, for instance, are bis-(hydroxymethane)-, bis-(hydroxyethane)- bis-(hydroxypropane)-, bis-(hydroxychloropropane)- and bis-(dihydroxypropane)-phosphinic acids.

The ethers of the bis-(hydroxyalkane)-phosphinic acid esters employed according to the invention advantageously contain 3 to 12% by weight of phosphorus. Free hydroxyl groups are carried in the molecule of such ethers which can react with isocyanate groups with the formation of polymer molecules. For this reason, the ethers of the bis-(hydroxyalkane)-phosphinic acid esters can partially or wholly replace the usual polyethers or polyesters used in the production of polyurethane molding masses. Such esters which are more or less viscous liquids are also easily mixed with the remaining components used in the production of polyurethane molding masses.

The saturated aliphatic bromine containing ethers obtained from compounds of Formula I and the ethers of the bis-(hydroxyalkane) phosphinic acid esters according to the invention are added to the molding masses which in addition can contain other polyethers or polyesters carrying free hydroxyl groups and the usual polyfunctional isocyanate, catalysts, such as tertiary amines, triethylene diamine, Sn(II) octoate, and additives, such as hydroxy alkyl group containing Si compounds (silicone oils) and, if foamed products are desired, a blowing agent, such as trichloromonofluoromethane. The quantities employed are such that the cured shaped polyurethane products obtained from such molding masses contain 0.1 to 25.0 weight percent of bromine and 0.1 to 6 weight percent of phosphorus. If, it should be expedient in special instances, other known flame retarding agents can also be included in the molding masses.

The molding masses according to the invention are then shaped and cured in a known manner, if desired, in the foamed state and, if necessary, at raised temperatures. The bromine and phosphorus compounds employed according to the invention have a tendency to lengthen the curing time required. This, however, can be compensated for by use of higher quantities of the catalyst. The desired quantity of catalyst is easily ascertained by simple preliminary tests.

The cured polyurethanes obtained according to the invention are self-extinguishing and their bromine content is only split off slowly upon contact with flames and as a result a long lasting protection against flames is attained, especially in the gas phase which is formed of the decomposition products in the immediate vicinity of the part subjected to the flames.

The phosphorus is chemically bound in the cured polyurethanes through P—C bonds. As already mentioned, there is practically no danger that cleavage of the polymer macromolecules occurs because of cleavage of the P—C bonds. The phosphorus containing products according to the invention exhibit practically no change in their mechanical and physical properties when compared to cured polyurethanes which contain no phosphorus. The ethers of bis-(hydroxyalkane)-phosphinic acid ester, especially, do not effect increased brittleness in the cured polyurethane products. When the cured products are subjected to the action of flames, the phosphorus content effects an agglutination of the parts contacted by the flames and thereby prevents combustion of the material of the cured product.

In the following illustrative examples cured polyurethane products according to the invention were prepared and investigated with regard to their combustion behavior. The combustion behavior of foamed cured products was investigated particularly, as such foamed products, in view of their greater surface area, are more easy to ignite and burn than compact cured products of the same composition.

The combustion behavior was investigated according to ASTM specification 1692.

Accordingly rods 15.24 cm. long whose quadratic base area had an edge length of 1.27 cm. were sawed from the cured polyurethane products, as the test pieces. These rods were supported on a wire netting of 2.5 meshes per cm.² which had been folded to an angle of 90° to form a channel. The channel was held at an angle of 30° from the horizontal and the rods laid therein so that they projected 1.27 cm. from the lower end thereof. Under draft free conditions a Bunsen burner was held for 10 seconds below the projecting ends of the rods so that its 5 cm. long non-luminous flame just touched them.

In the examples the proportions are given in parts by weight unless specified otherwise.

EXAMPLE 1

17.7 parts of sorbitol polyether (hydroxyl number 492) were mixed with 34.3 parts of toluylene diisocyanate. The resulting viscid liquid mass was then mixed with 14.1 parts of the addition product of 1 mol pentaerythritol dibromohydrin and 3.25 mol of propylene oxide (bromine content 35.5%, hydroxyl number 312), 33.9 parts of the product of 1 mol of bis-(hydroxypropane)-phosphinic acid sodium salt and 4.1 mol of epichlorohydrin (phosphorus content 5.9%, hydroxyl number 279), 0.8 part of tin (II) octoate, 26.0 parts of monofluorochloromethane and 0.6 part of silicone oil and such mixture foamed and cured. The hard polyurethane foam thus produced contained 2% of phosphorus and 5% of bromine and met the requirements of ASTM specification 1692. The flames extinguished within 5 seconds after removal of the Bunsen flame.

EXAMPLE 2

A mixture of 14.5 parts of sorbitol polyether (hydroxyl number 492), 47.5 parts of 4,4'-diphenylmethane diisocyanate, 11.0 parts of the addition product of 1 mol pentaerythritol dibromohydrin and 2 mol of ethylene oxide (bromine content 45.6%, hydroxy number 312), 27.0 parts of the product of 1 mol of bis-(hydroxymethane)-phosphinic acid sodium salt and 3.5 mol of epichlorohydrin (phosphorus content 7.4%, hydroxyl number 351), 0.9 part of tin (II) octoate, 26.0 parts of monofluorotrichloromethane and 0.6 part by weight of silicone oil was foamed and cured. The resulting hard polyurethane foam contained 2% of phosphorus and 5% of bromine. It met the requirements of ASTM specification 1692. The flames extinguished within 5 seconds after removal of the Bunsen flame.

EXAMPLE 3

A mixture of 17.6 parts of a polyester of adipic acid, phthalic acid, butylene glycol and trimethylol propane hydroxyl number 374), 47.6 parts of 4,4'-diphenylmethane diisocyanate, 11.0 parts of the addition product of 1 mol of pentaerythritol dibromohydrin and 2 mol of ethylene oxide (hydroxy number 312, bromine content 45.6%), 23.8 parts of the product of 1 mol of bis-(3-chloro-2-hydroxy propane)-phosphinic acid sodium salt and 1.7 mol of epichlorohydrin (phosphorus content 8.4%, hydroxyl number 430), 0.7 parts of tin (II) octoate, 26 parts of monofluorotrichloromethane and 0.6 part of silicone oil were foamed and cured. The resulting cured hard polyurethane foam contained 2% of phosphorus and 5% of bromine. It met the requirements of ASTM specification 1692. The flames extinguished within 5 seconds after removal of the Bunsen flame.

EXAMPLE 4

A mixture of 8.9 parts of sorbitol polyether (hydroxyl number 492), 48.3 parts of 4,4'-diphenylmethane diisocyanate, 10.5 parts of the addition product of 1 mol of pentaerythritol dibromohydrin with 2.35 mol of glycidol (bromine content 47.8%, hydroxyl number 378), 32.3 parts of the product of 1 mol of bis-(hydroxypropane)-phosphinic acid sodium salt and 3.6 mol of epichlorohydrin (phosphorus content 6.2%, hydroxyl number 375), 0.8 part of tin(II) octoate, 26 parts of monofluorotrichloromethane and 0.6 part of silicone oil was foamed and cured. The resulting cured hard polyurethane foam contained 2% of phosphorus and 5% of bromine. It met the requirements of ASTM specification 1692. The flames extinguished within 5 seconds after removal of the Bunsen flame.

EXAMPLE 5

A mixture of a branched polyester of adipic acid, phthalic acid and trimethylolpropane (hydroxyl number 364), 44.8 parts of 90% 4,4'-diphenyl diisocyanate, 11.7 parts of the addition product of 1 mol of pentaerythritol dibromohydrin and 1.2 mol of epichlorohydrin (bromine content 42.7%, hydroxyl number 302), 18.5 parts of bis-(hydroxylmethane)-phosphinic acid (in the form of the product obtained by reacting 1 mol of bis-hydroxy phosphinic acid sodium salt with 2 mol of propylene oxide and then with 1 mol of epichlorohydrin, of a (phosphorus content of 10.8% and a hydroxyl number of 348), 0.2 part of triethylene diamine, 26.0 parts of monofluorotrichloromethane and 0.7 part of silicone oil, was foamed and cured. The resulting cured hard polyurethane foam contained 2% of phosphorus and 5% of bromine. It met the requirements of ASTM specification 1692. The flames extinguished within 5 seconds after removal of the Bunsen flame.

EXAMPLE 6

A mixture of 17.6 parts of an ethylene-propylene oxide polyether (hydroxyl number 432), 43.4 parts of 90% 4,4'-diphenyl diisocyanate, 10.5 parts of the addition product of 1 mol of trimethylol propane dibromohydrin and 1.02 mol of glycidol (bromine content 47.7%, hydroxyl number 338), 28.5 parts of the product of 1 mol of bis-(hydroxypropane)-phosphinic acid sodium salt and 2.6 mol of epichlorohydrin (phosphorus content 7.0%, hydroxyl number 258), 0.2 part of triethylene diamine, 30.0 parts of monofluorotrichloromethane and 0.7 part of silicone oil was foamed and cured. The resulting cured hard polyurethane foam contained 2% of phosphorus and 5% of bromine. It met the requirements of ASTM specification 1692. The flames extinguished within 5 seconds after removal of the Bunsen flame.

We claim:

1. A self-extinguishing cured polyurethane product from curable molding masses containing (1) at least one polyhydroxy compound selected from the group consisting of polyethers and polyesters containing at least two free hydroxyl groups, (2) at least one polyfunctional organic isocyanate, (3) a curing catalyst and (4) an organic bromine-containing compound and (5) an organic phosphorus-containing compound which condenses into the polyurethane during curing in such quantities that the polyurethane product contains 0.1 to 25% by weight of bromine and 0.1 to 6% by weight of phosphorus, said phosphorus being chemically bound in the polyurethane product through P—C bonds, said polyurethane being produced by a process which comprises (A) employing as the bromine-containing compound the reaction product of (a) an organic bromine compound of the formula

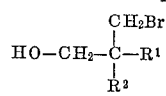

wherein each of $R^1$ and $R^2$ individually is selected from the group consisting of $-CH_2OH$, $-CH_2Br$, $-CH_3$, $-C_2H_5$, $-C_3H_7$,

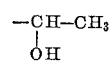

and (b) a compound of the formula

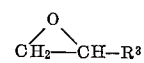

in a molar ratio of 1:1 to 1:20 wherein $R^3$ is selected from the group consisting of —H, —$CH_3$, —$CH_2OH$, —$CH_2Br$, —$CH_2Cl$, —$COOCH_3$, —$COOC_2H_5$ and —$C_6H_5$ and (B) employing as the organic phosphorus-containing compound the reaction product of epichlorohydrin with an alkali metal salt of bis-(hydroxy alkane) phosphinic acid of the formula $$\begin{matrix} & O \\ & \| \\ R- & P-OH \\ & | \\ & R \end{matrix}$$

wherein R is selected from the group consisting of

—$CH_2OH$, —$CH_2CH_2OH$, —$CH_2$—$CH_2$—$CH_2OH$,
—$CH_2CHOH$—$CH_2OH$, —$CH_2$—$CHCl$—$CH_2OH$ and —$CHOHR^1$ wherein $R^1$ is selected from the group consisting of —$C_2H_5$, $C_3H_7$, —$C_4H_9$ and

—$CH_2CHOH$—$CH_3$

2. The product of claim 1 wherein the phosphorus-containing compound is the reaction product of the salt of the defined bis-(hydroxy alkane) and epichlorohydrin when reacted in a molar ratio of at least 1:3.

3. The polyurethane product of claim 1 which is a foamed polyurethane.

4. A self-extinguishing cured polyether or polyester polyurethane from curable molding masses containing (1) a polyether or polyester having at least two free hydroxyl groups, (2) a polyfunctional organic isocyanate, (3) a curing catalyst, (4) an organic bromine-containing compound which has a quaternary atom which carries at least one bromoethyl group and (5) an organic phosphorus-containing compound which is bound through P—C bonds into the polyurethane in an amount of 0.1 to 25% by weight of bromine and 0.1 to 6% by weight of phosphorus, said bromine compound being the product of an organic bromine compound of the formula $$\begin{matrix} & CH_2Br \\ & | \\ HO-CH_2- & C-R^1 \\ & | \\ & R^2 \end{matrix} \quad (I)$$

wherein each of $R^1$ and $R^2$ individually is selected from the group consisting of —$CH_2OH$, —$CH_2Br$, —$CH_3$, —$C_2H_5$, —$C_3H_7$,

—CH—$CH_3$
|
OH and a compound of the formula

  (II)

wherein $R^3$ is selected from the group consisting of —H, —$CH_3$, —$CH_2OH$, —$CH_2Br$, —$CH_2Cl$, —$COOCH_3$, —$COOC_2H_5$ and —$C_6H_5$, the phosphorus compound being the reaction product of epichlorohydrin with the salt of a bis-(hydroxy alkane) phosphinic acid of the formula $$\begin{matrix} & O \\ & \| \\ R- & P-O-X \\ & | \\ & R \end{matrix} \quad (III)$$

wherein X is selected from the group consisting of sodium, potassium and R represents the following radicals:
—$CH_2OH$, —$CH_2CH_2OH$, —$CH_2$—$CH_2$—$CH_2OH$,
—$CH_2$—$CHOH$—$CH_2OH$, —$CH_2$—$CHCl$—$CH_2OH$,
—$CHOHR^4$ wherein $R^4$ represents —$CH_3$, —$C_2H_5$,
—$C_3H_7$, —$C_4H_9$, —$CH_2CHOH$—$CH_3$ 5. The foamed polyurethane of claim 4.
6. The non-foamed polyurethane of claim 4.

References Cited

UNITED STATES PATENTS

| 3,072,582 | 1/1963 | Frost | 260—2.5 |
| 3,131,115 | 4/1964 | Robitschek et al. | 161—191 |
| 3,245,922 | 4/1966 | Worsley et al. | 260—2.5 |
| 3,249,562 | 5/1966 | Schoepfle et al. | 260—2.5 |
| 3,252,922 | 5/1966 | Degener et al. | 260—2.5 |
| 3,264,233 | 8/1966 | Trescher | 260—2.5 |

FOREIGN PATENTS

| 249,478 | 7/1960 | Australia. |
| 704,146 | 3/1965 | Canada. |
| 740,030 | 8/1966 | Canada. |
| 995,046 | 10/1965 | Great Britain. |
| 1,246,971 | 10/1960 | France. |

DONALD E. CZAJA, Primary Examiner

M. J. WELSH, Assistant Examiner

U.S. Cl. X.R.

260—75, 77.5, 950, 953